US007870250B2

(12) United States Patent
Nauerz et al.

(10) Patent No.: US 7,870,250 B2
(45) Date of Patent: Jan. 11, 2011

(54) METHOD FOR CONTINUOUS ADAPTATION OF USER-SCOPED NAVIGATION TOPOLOGIES BASED ON CONTEXTUAL INFORMATION AND USER BEHAVIOR

(75) Inventors: Andreas Nauerz, Boeblingen (DE); Stefan Liesche, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 11/758,519

(22) Filed: Jun. 5, 2007

(65) Prior Publication Data

US 2008/0065762 A1 Mar. 13, 2008

(30) Foreign Application Priority Data

Sep. 11, 2006 (EP) ............................. EP06120470

(51) Int. Cl.
*G06F 15/173* (2006.01)
(52) U.S. Cl. .................... 709/224; 709/225; 707/722; 707/736
(58) Field of Classification Search ........................ None
See application file for complete search history.

(56) References Cited

U.S. PATENT DOCUMENTS

| | | | | |
|---|---|---|---|---|
| 6,049,812 A * | 4/2000 | Bertram et al. | ............. | 715/205 |
| 6,161,112 A * | 12/2000 | Cragun et al. | ............... | 715/251 |
| 6,526,424 B2 * | 2/2003 | Kanno et al. | ................. | 715/229 |
| 7,249,104 B2 * | 7/2007 | Zuili | ............................ | 705/52 |
| 2003/0055831 A1 * | 3/2003 | Ryan et al. | .................. | 707/100 |
| 2005/0097190 A1 * | 5/2005 | Abdelhak | .................... | 709/217 |
| 2005/0267869 A1 * | 12/2005 | Horvitz et al. | .................. | 707/2 |

* cited by examiner

*Primary Examiner*—Wing F Chan
*Assistant Examiner*—Hitesh Patel
(74) *Attorney, Agent, or Firm*—David A. Dagg

(57) ABSTRACT

The disclosed system relates to the field of network computing, and in particular to method and system for designing a Web Portal including a hierarchical structure of portal pages and portlets for accessing Web contents accessible via the Portal. The disclosed system operates to improve Web application user navigation. During navigation by a user in the topology of the Web portal, the disclosed system automatically senses information about the navigational behaviour of the user for each page visited during said navigation. The disclosed system derives page hits and page target hits from the sensed information, wherein page hits are defined when pages are clicked on for reaching another page, and page target hits are defined when a user clicks on pages in order to perform a page-specific task or to receive some page-specific information. The disclosed system uses at least one predefined metric based on the sensed information for generating a utility ranking for the Web pages visited during the user navigation, and defines a user-specific navigation topology based on a prioritization of the ranked Web pages, wherein higher ranked Web pages are arranged in relatively higher topology levels. The disclosed system displays the user-specific topology to the user after a subsequent user log-in to the Web portal.

10 Claims, 6 Drawing Sheets

METHOD FOR CONTINUOUS ADAPTATION OF USER-SCOPED NAVIGATION TOPOLOGIES BASED ON CONTEXTUAL INFORMATION AND USER BEHAVIOR

CROSS REFERENCE TO RELATED APPLICATIONS

The present application claims priority under 35 USC 119 to European Application Number EP06120470, filed Sep. 11, 2006.

FIELD OF THE INVENTION

The present invention relates to the field of network computing, and in particular to a method and system for designing a Web Portal or Enterprise Portal including a hierarchical structure of portal pages and portlets for accessing Web contents or Enterprise contents accessible via the Portal.

BACKGROUND OF THE INVENTION

FIG. 1 gives a schematic system view of a Portal server implementing a Web Portal, for example, such as, for example, an IBM WebSphere Portal or Jetspeed2 Enterprise Portal (www.Portals.apache.org/jetspeed-2/Portal-design.html). Such a Web Portal may include complex functionality implemented on a network server-for example on a Web server 100, significant elements of which are logic components for user authentication 105, state handling 110, aggregation 170 of fragments, a plurality of Portlets 120 (further described below) provided in respective pages 125 with a respective plurality of APIs 130 to a respective Portlet container software 135 for setting them into the common Web page context, and some Portal storage resources 140. The logic components of FIG. 1 are operatively connected such that data can be exchanged between single components as required. This is roughly depicted in FIG. 1.

In more detail, a Portal engine of the Web server in FIG. 1 implements an aggregation of Portlets 120 based on the underlying Portal model 150 and Portal information such as security settings, user roles, customization settings, and device capabilities. Within the rendered page, the Portal automatically generates the appropriate set of navigation elements based on the Portal model. The Portal engine invokes Portlets during the aggregation as required and when required and uses caching to reduce the number of requests made to Portlets. For example, the IBM WebSphere Portal employs open standards such as the Java Portlet API (application programming interface). It also supports the use of a remote Portlet via the WSRP (Web Services for Remote Portlets) standard.

The Portlet container 135 is a single control component competent for all Portlets 120, which may control the execution of code residing in each of these Portlets. It provides the runtime environment for the Portlets and facilities for event handling, inter-Portlet messaging, and access to Portlet instance and configuration data, among others. The Portal resources 140 are in particular the Portlets 120 themselves and the pages 125, on which they are aggregated in form of an aggregation of fragments. A Portal database 128 stores the portlet description, featuring some attributes like portlet name, portlet description, portlet title, portlet short title, and keywords; the portlet interaction interface description, which is often stored in form of WSDL (Web Service Description Language) documents. The Portal database also stores the Portal content structure, i.e. the hierarchical structure of portal pages, which may again contain nested pages, and portlets. This data is stored in the database 128 in an adequate representation based on conventional techniques like relational tables.

The before-mentioned aggregation logic 170 includes all steps that are required to assemble a page. Typically, these steps are to load a content structure from storage, to traverse it and to call the instances referenced in the structure in order to obtain their output, which is assembled to a single page.

The content structure may be defined through, for example, Portlet Customization by the administrator.

When Web applications are visited by a Web user, a user is usually displayed a navigation menu that provides some means to access underlying content. A navigation menu is usually structured in a tree-like topology, and users are forced to traverse the tree in order to reach a node matching the content the user is interested in. Specifically, Web portals are equipped with such navigation menus which must be used to navigate through all of the contents the Web portal provides.

As a matter of fact, not every user is interested in the same content, and hence the structure which is given on a given portal may satisfy the needs of a certain user group, but for many individual users the given topology does not satisfy their needs. Prior art systems allow blend-out of certain nodes of the topology, i.e. blend-out a page or parts of a page, basically some portlets. This, however is a very inflexible way to traverse the navigation tree.

It is accordingly an objective of the present invention to provide a method and system offering improved Web portal navigation.

SUMMARY OF THE INVENTION

In order to address the above described and other shortcomings of previous techniques, a method and system in a Web portal environment are disclosed for modifying a given hierarchical navigation topology including nodes and edges connecting between the nodes, in which topology a Web portal page corresponds to a predetermined topology level displaying one or more portlets. The disclosed method includes the steps of:

a) during navigation by a user in the topology of the Web portal, automatically sensing information about the navigational behavior of the user for each page included in the navigation, b) deriving page hits and page target hits from the sensed information, wherein page hits are defined for pages clicked for reaching another page, and page target hits are defined for pages a user clicks in order to perform a page-specific task or to receive some page-specific information, c) using at least one predefined metric based on the sensed information for generating a utility ranking for the Web pages included in the user navigation, d) defining a user-specific topology based on a prioritization of the ranked Web pages, wherein the higher ranked Web pages are arranged in a respective higher topology level, or on the same level at a page location more easily observable by the user, e.g., arranged higher in the page or more towards its left margin (in Arabic speaking countries more closely to the right margin, respectively), e) displaying the user-specific topology to the user after a subsequent log-in on the Web portal.

In the present disclosure, to "sense information refers to all particular interfaces to "sensors" and reading the information provided by them. Thus, time information is sensed from the system clock, date information is sensed from any date source of the Web server system, the user identifier (ID) is sensed from a preceding log-in procedure, etc.

Examples of metrics used in various embodiments of the disclosed system include:

(1) The number of times (i.e. how often) a user has interacted with an element of a page, and/or (2) the number of times (i.e. how often) a user has viewed a page, or the frequency of visits of a page, and/or (3) the current location of a user, and/or (4) the hit time, month and day of week, etc.

As used herein, the term "utility" is meant to denote the importance of a Web page for a user. This importance is captured in the disclosed system by use of metrics such as those described above. Of course, further importance parameters can also or alternatively be used, potentially independently of the above metrics, if useful for a use case of a given embodiment.

Further, a page hit is defined herein as a first mouse click to a page and a subsequent mouse click being done within a predetermined time range T-hit after the first click, e.g. 2 seconds. A page target hit is defined herein as a first click to a page and a subsequent click being done after a predetermined second time range T-target-hit, e.g. 10 seconds, or after the median time range predetermined for a user resting on a single page has passed.

The time-related weighting in the disclosed system reflects the use changes which influence the user behavior slightly but usually steadily.

A sub-node which directly depends on a moved node is also moved together with the highlighted node, in particular, when a sub-node has a significant semantic relation to the highlighted node. According to the disclosed system, a storage module stores the difference between the new topology and the original one, when the user has completed one or more topology modifications. A transformation component provided according to the present invention displays the user-modified topology within the Web application, whenever the same user who modified the topology re-enters or logs-in again into the Web application. Preferably, the transformation is implemented by a so-called "dynamic node", which is understood to be a node which, when clicked on by the user, invokes an underlying function that retrieves the user-modified topology. Preferably, the root node is the dynamic node. An important use case is application of the disclosed method to Web portals.

Further as used herein, the term "user-scoped navigation topologies" refers to user interface navigation topologies, which are adapted to a specific user.

BRIEF DESCRIPTION OF THE DRAWINGS

Embodiments of the present invention will now be described, by way of examples only, with reference to the accompanying drawings in which.

DETAILED DESCRIPTION OF EXEMPLARY EMBODIMENTS

With general reference to the Figures, and with special reference now to FIG. 2 an illustrative embodiment of the present invention will be described in more detail next below.

Figure 1:
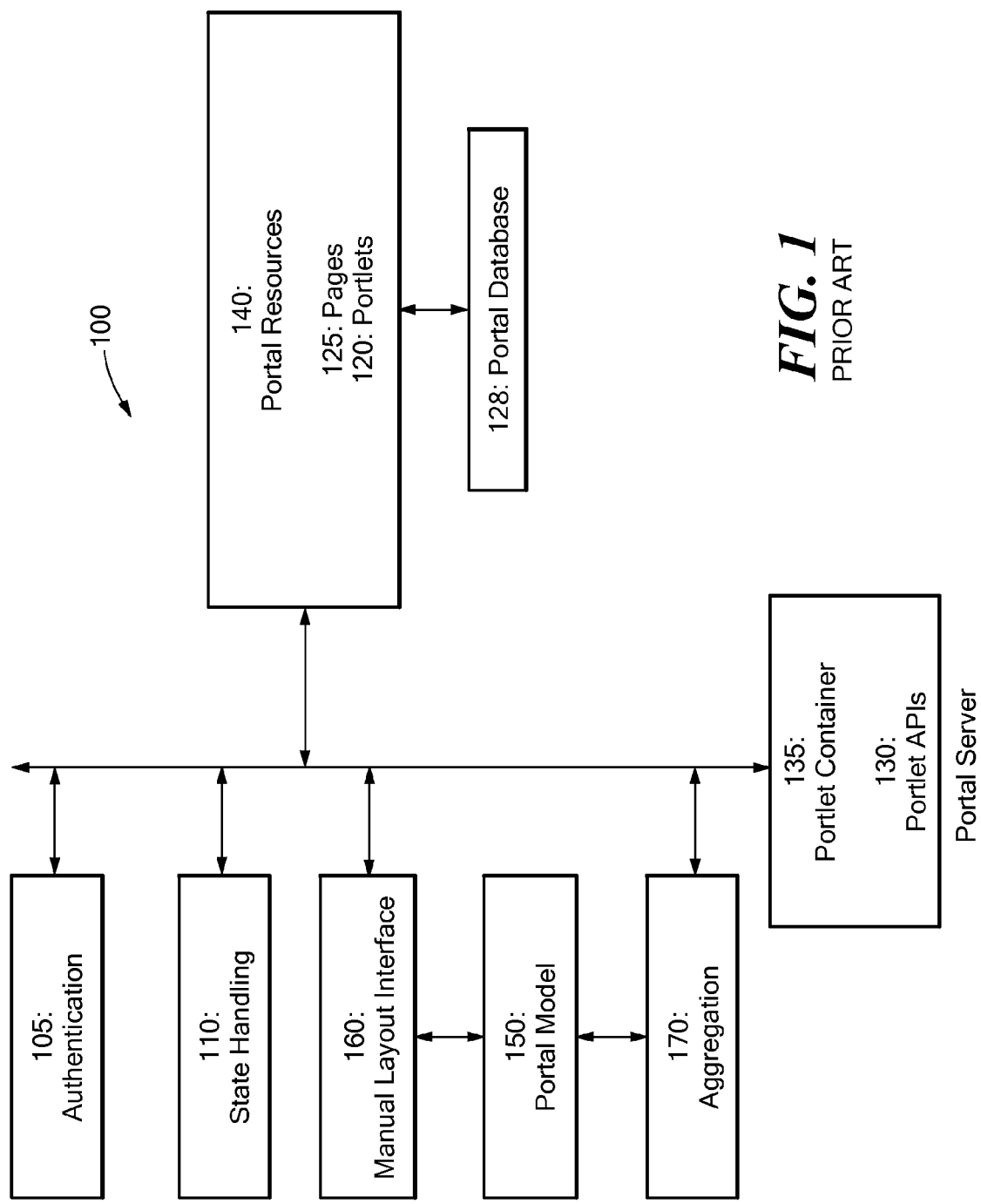
FIG. 1 is a schematic diagram illustrating the structural components of a portal server including lines of interactions.
Figure 2:
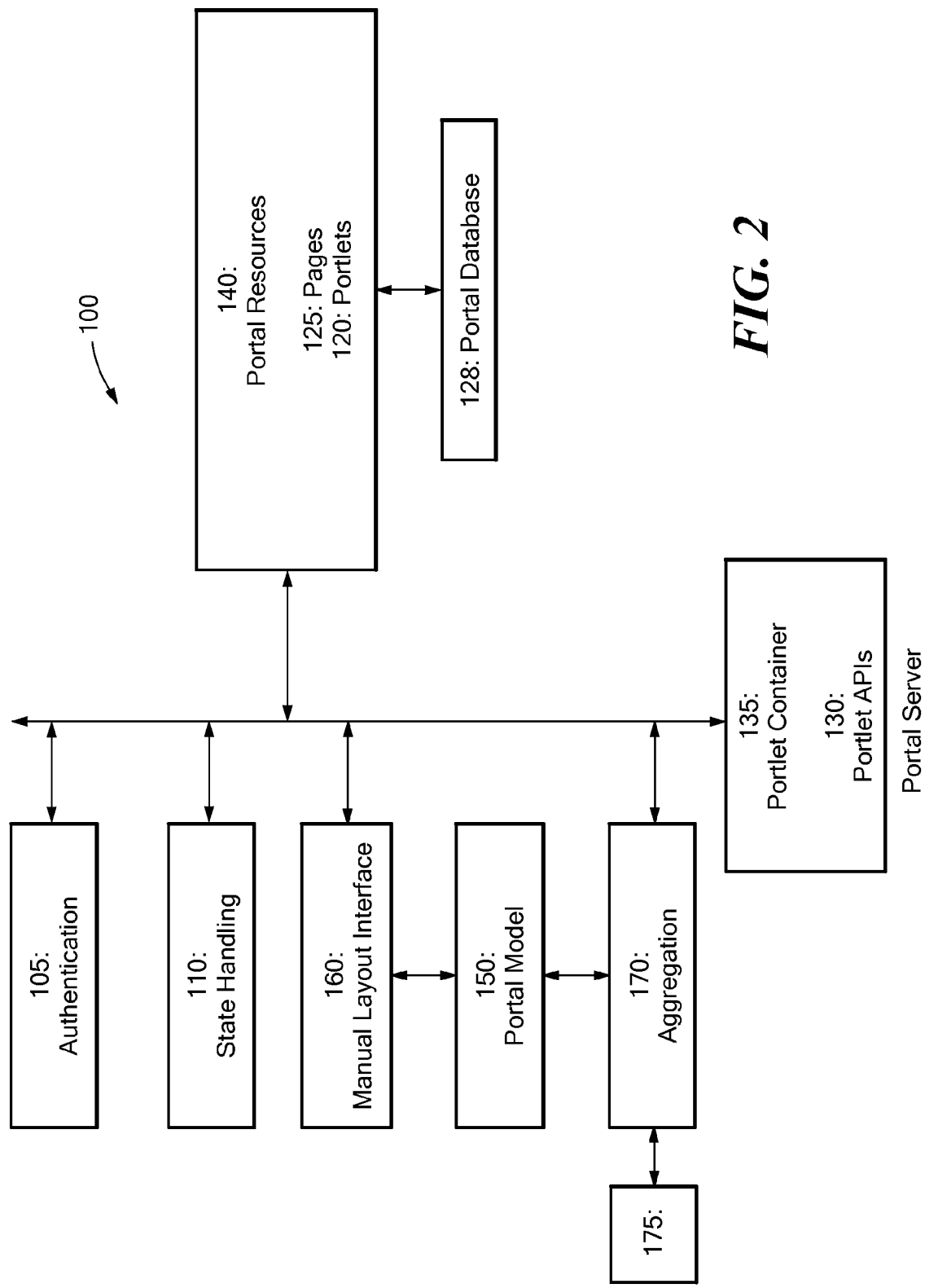
FIG. 2 is a schematic block diagram representation of a portal server according to an embodiment of the invention, and illustrating structural components implemented therein.

FIG. 2 shows the disclosed component 175, built-in to a portal server and cooperating closely with the aggregation component 170 via a respective programming interface.

Figure 3:
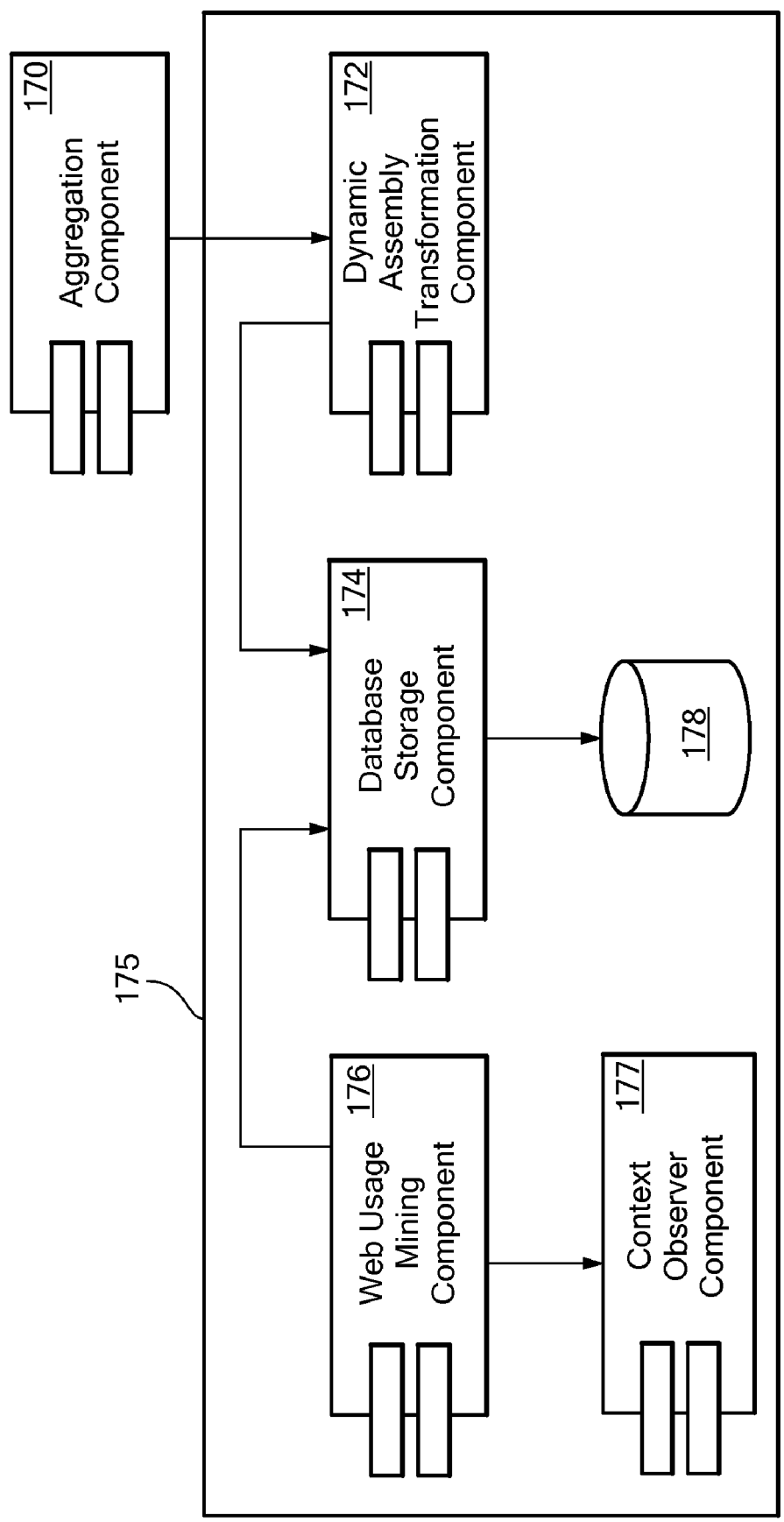
FIG. 3 is a schematic diagram further illustrating an example of component 175 of FIG. 2.

With particular reference to FIG. 3, the before-mentioned aggregation component 170 controls further functionalities depicted in boxes 172, 174, 176, 177 and 178, and displays a given topology of a portal to a portal user.

A Web-usage mining component 176 includes a read interface to the Web-server's inbox, which receives a user request resulting from a user clicking somewhere on a link visible within a currently displayed Web page. Further, the component 176 includes an interface to the Web server's clock in order to store the arrival times of a user request. Via these interfaces, the Web usage mining component 176 is notified on each user interaction performed by a user when navigating certain portal topology. Component 176 calculates the before mentioned hit-values and target hit-values, associated with a given Web page, and associated with a given context, and invokes the database storage component 174 in order to form a complete set of sensing information, while the user is interacting with the Web portal.

A dynamic assembly transformation component 172 is provided in order to perform the disclosed reconstruction, and to replace the original navigation topology by the user-specific topology.

In one embodiment, a transformation is implemented as a function associated with the root node of the original navigation topology. The root node thereby becomes a so-called "dynamic node", as described above. Every time the aggregation component 170 traverses the original navigation topology, it immediately stops at the root node and asks the transformation for the sub-model reflecting the user-specific topology to be built-in under the dynamic node. This build-in process may be implemented by linking an original node to the user-specific node of the user-specific topology. The transformation component 172 than reads the user-specific navigation topology for the currently logged-in user from the respective database entry of this user, and constructs the user-specific sub-model of the navigation tree (navigation topology), which is then phased-in under the root node, representing the entire custom navigation topology for this user. In one embodiment, each node of the user-specific navigation topology is actually a reference to a real node in the original navigation topology such that changes regarding the content of a node in the real navigation topology are automatically reflected in this "virtual" user-specific structure without requiring changing a user-specific topology on each content modification within the original topology. Accordingly, the virtual structure appears exactly like the original navigation structure, except that the user-specific structure is arranged differently. The look-and-feel behavior, however, is always maintained in the user-specific portal.

A context observer component 177 is provided according to one embodiment in order to determine context attributes for defining a current context. In order to do that, component 177 has respective functional interfaces in order to request exact time information, date information, to identify the device type currently in use by the Web portal visitor, and possibly further information derivable or input by any other sensor device, like for example a GPS sensor element. Component 177 feeds any context information to the Web usage mining component 176 in order to enable component 176 to store current sensing information with the respective correct context.

Figure 4:
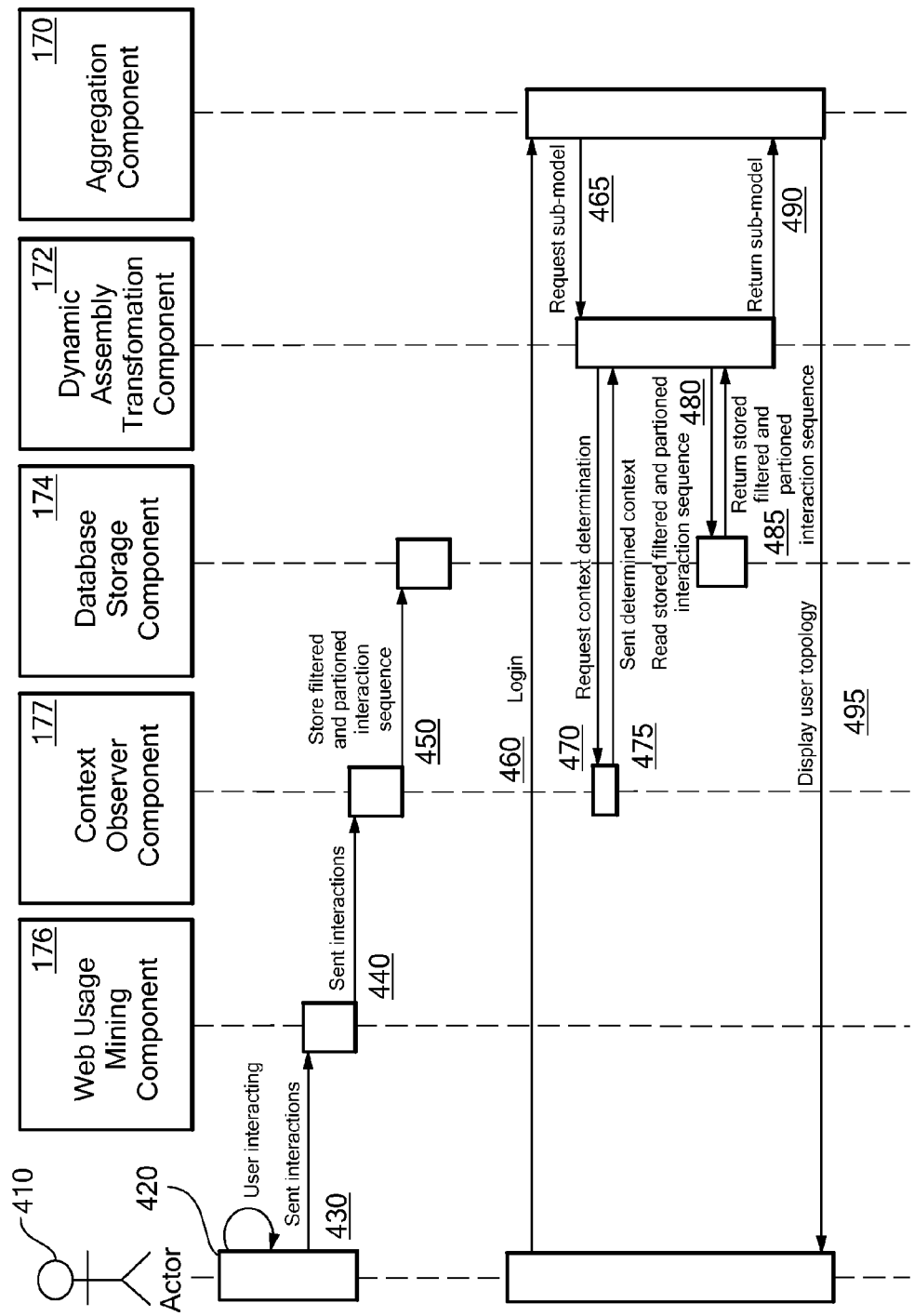
FIG. 4 is an interaction diagram illustrating a sequence of actions performed by a user ("actor"), and components implemented by an embodiment of the disclosed method, as illustrated in FIG. 3.

With further reference now to FIG. 4, the interaction between a portal visitor (user or actor 410) and the before mentioned components 170 to 177, are described in more detail below.

The user 410 interacts with the Web portal Web pages. These interactions include multiple repeated actions, for example clicking on a link, clicking on a portal, and/or clicking on any resource which can be clicked on in a Web page. In order to illustrate the plurality of interactions, the respective arrow 420 is symbolized as a loop symbol. For each interaction the following procedure will be performed:

A current interaction notification is sent at step 430 to the Web usage mining component 176. Such notification includes a user-ID, which is obtainable after a log-in of the current user, and includes information regarding which node of which page was clicked on, and when this action has occurred. Thus, a respective data set includes user-ID, node-ID, page-ID and time and date information. Optionally, it may include also device type information from which can be derive whether the user uses PDA, notebook, or desktop computer, respectively.

At step 440, data is sent to the context observer component 177, in order to determine the actually used context (see step 440 and above step 430). When the data collection is completed, the data is stored in step 450 within the database 178, by the database storage component 174. Thus, the storage component 174 will preferably store for each page the number of hits, the number of target hits, the utility value and some flags indicating the currently used device type (at least PDA or other computers).

Then, in step 460, the same user logs-in again. In this step, the aggregation component 170 invokes a mechanism which evaluates the user-ID, and potentially also the currently used device-ID and other context information (see above). The user is navigated to the root node, which may be implemented as a dynamic node.

Note that a transformation function is preferably implemented by a "dynamic node", which is a node which, when clicked on by the user, invokes an underlying function, which retrieves the user-modified topology. For example, the root node may be the dynamic node.

Thus, aggregation component 170 can be responsive to a dynamic node, which is preferably used to request a user-specific sub model, i.e. a user-specific navigation topology from the dynamic assembly transformation component 172 (see step 465).

Transformation component 172 will then the request, at step 470, the current determination of the currently used context. It directs a request to the context observer component 177, which reads the current context data from the last request header, and from other input sources, such as system time, in order to deliver time stamps, etc. It receives this context in a subsequent step 475.

Transformation component 172 will then read the target hit values for all nodes of the currently used context stored in database 178 (see step 480). It then invokes a function in order to generate a new sub-model. Then it returns the newly generated sub-model.

Finally, aggregation component 170 displays the topology of the new sub model associated with the before mentioned transformation, and displays it to the user (see step 495).

An embodiment of the disclosed structure re-ordering method processes input variables as follows: the currently visited Web page, the current level, and the current visitor's identity. If the current value of the current page (of the current user) is smaller than the associated utility threshold of the actual level, and, optionally, if the current page had been promoted before, then the current page is demoted to the original position at which it was located before the promotion.

If the current utility value of the page is smaller then a predetermined threshold value registered for hiding the page, then the page will be hidden to the user. This means respective HTML-code is generated that hides a respective page or hides a respective part of a page. Then node promotion cases are checked, for example in a loop which tests the current utility value and compares it to the utility threshold stored for the next lower page level. A page will be promoted when its current utility value is greater than or equal to this before mentioned threshold value.

Figure 5:
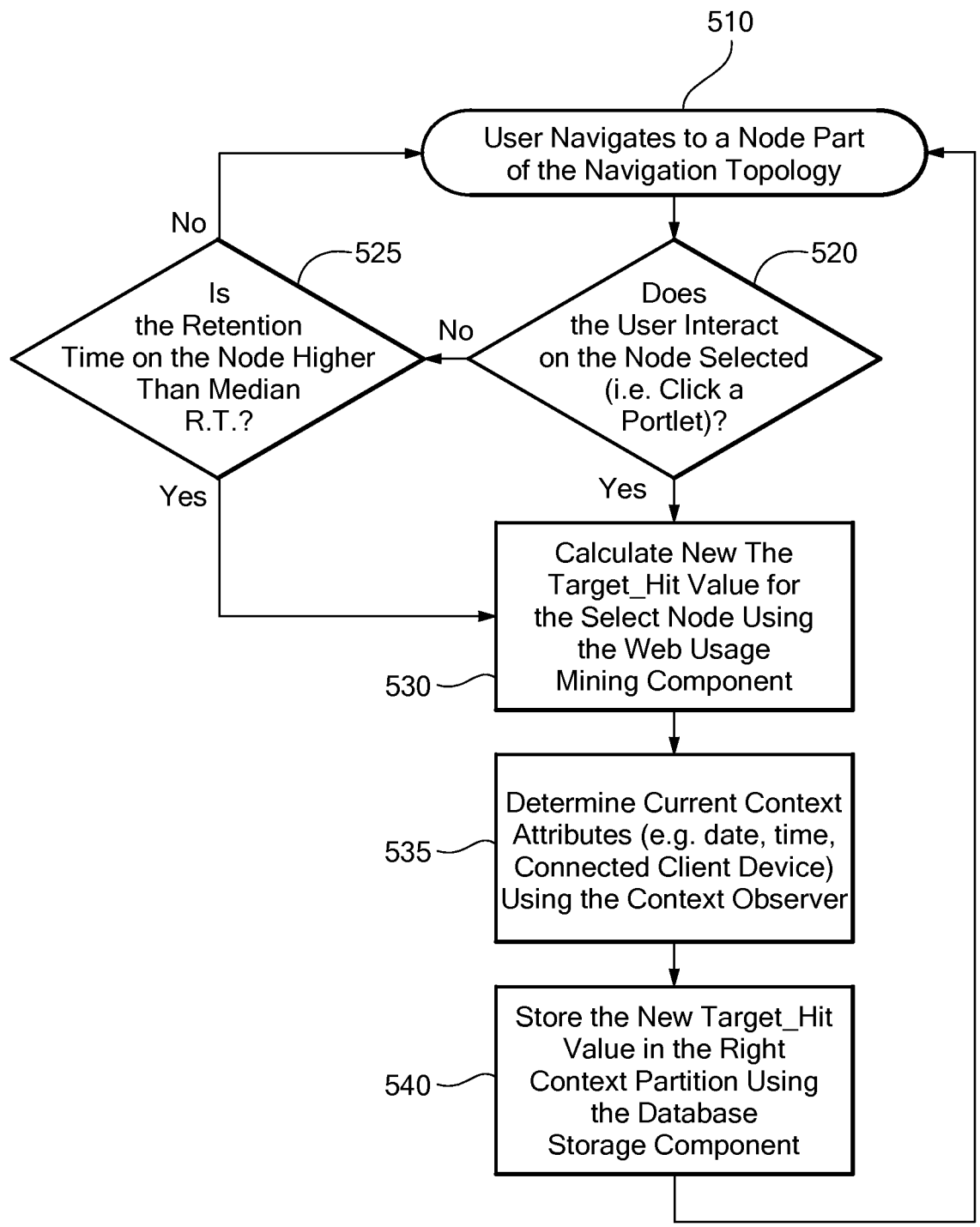
FIG. 5 is a flow chart diagram illustrating the control flow of a preferred embodiment of the disclosed method during observation of user behavior when navigating a Web portal topology.

Next and with reference to FIG. 5, details of the user behavior observation are described.

In step 510 a user navigates to a node that is part of the navigation topology. This node part can be any clickable item on a displayed Web page. Then, a check 520 is performed testing if the user interacts with a certain, selected node. For example, at step 520 it is tested whether the user clicks on a portlet. In the NO case, a retention time is calculated at step 525 which is associated with this specific selected node based on the time associated with the click detected in step 520 and the time of a next, subsequent click associated with a user request, and received at the inbox of the Web server. If the retention time, which will be normally the difference between such times, is higher than a pre-calculated median retention time, step 525 is followed by step 530. Otherwise, step 525 is followed by step 510.

In the YES case following step 520, step 530 is entered. In step 530 the target hit value for the selected node is re-calculated by using the Web usage mining component 176.

Then at step 535, the current context attributes are determined using the context observer component 177. Finally, in step 540 the new target hit value is stored in the proper context partition using the database storage component 174. Then a branch is performed back to step 510 in order to observe the next user interaction.

Figure 6:
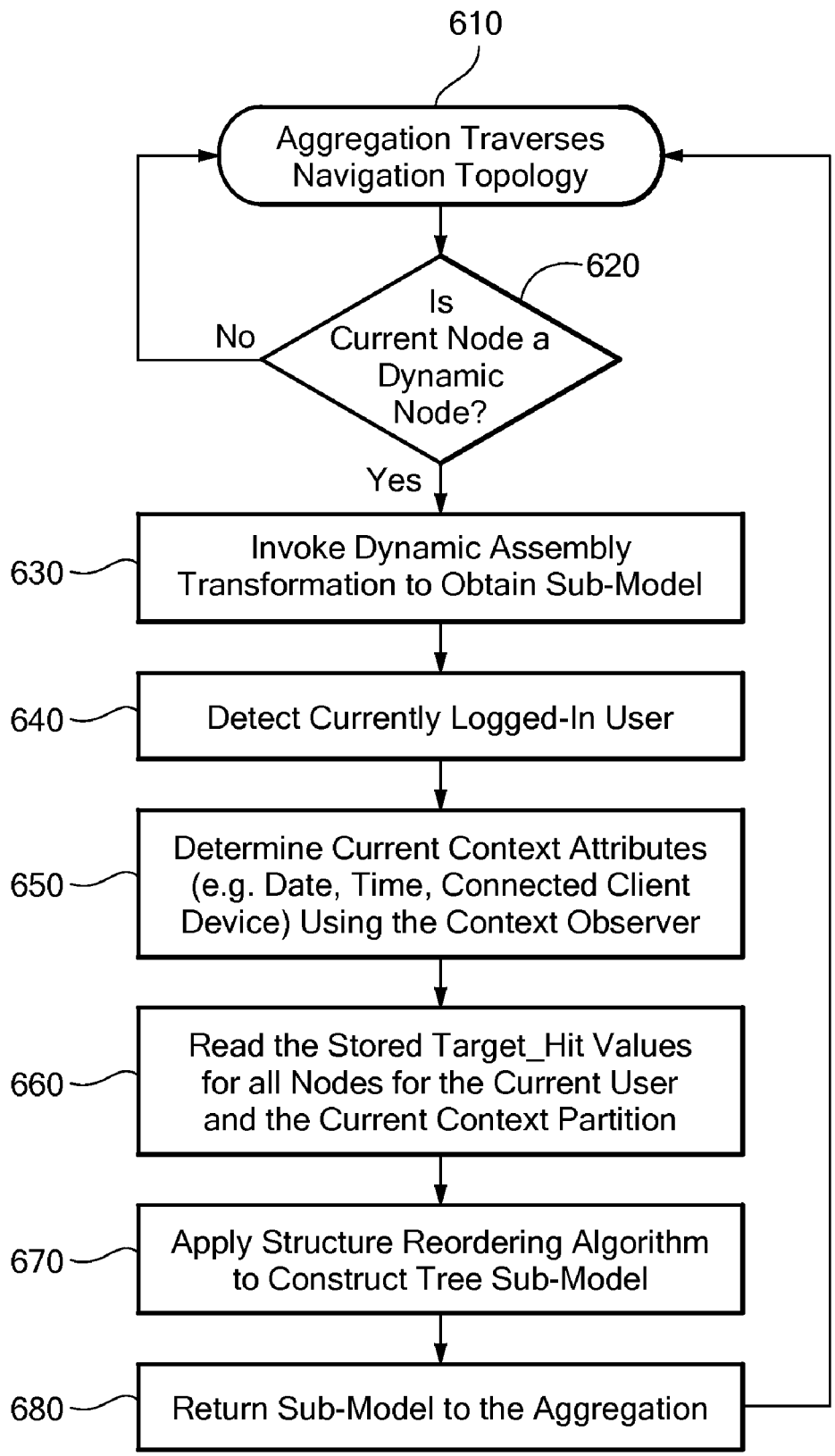
FIG. 6 is a flow chart according to FIG. 5, further illustrating the definition and creation of a user-specific topology based on calculations from FIG. 5.

With reference to FIG. 6 the control-flow when defining a new, user-specific topology will be described in more detail:

Aggregation component 170 traverses a given portal navigation topology at step 610, for example in relation to user actions. When a node is encountered during the traversal, a decision 620 is taken as to whether or not the current node is a dynamic node. In the NO case, step 620 is followed by step 610. In the YES case, step 620 is followed by step 630, in which the dynamic assembly transformation component 172 is invoked in order to obtain the correct, user-specific sub model.

In step 640 the user-ID of the currently logged-in user is detected and evaluated, and in step 650 the respective current context attributes (e.g. date, time used client device) are determined by using the context observer component 177.

In step 660 the stored target hit values for all nodes for the current user and the current context partition are read and evaluated.

The before mentioned topology structure reordering algorithm is applied in step 670 which results in constructing a new tree sub model, which is user-specific, context-specific and improved in relation to previous solutions. Then finally in step 680 this newly generated sub model is returned to the aggregation component 170.

The structure re-ordering algorithm mentioned above should be designed to re-order nodes in order to form a user-adapted topology structure. The disclosed method will detect the utilization or importance of each page in a user-specific way and will quantitatively represent this by the before mentioned utility parameter. In one embodiment, each level in the content tree of the navigation topology is assigned a utility threshold that all the pages lying in that level have to exceed. During the structure adaptation algorithm each page is moved to the highest possible level as close as possible to the root node or a homepage having a utility threshold lower or equal to its own utility value. Accordingly, there are three possible actions to be performed for each page—promotions, demotions and hidings, as previously discussed.

It will be appreciated by a skilled reader that instead of hiding a non-used page (or a seldom used page), such a page can also be placed in a position in the navigation apology which can be used only with relatively high difficulty (although the page can be found, if necessary). Moreover, the threshold assigned to each level in the hierarchy can be configured differently for one variant from another other. Thus, for example, higher thresholds can be set for the automatic adaptation so that only really useful pages are promoted while concurrently the number of structure modifications can be reduced in order to minimize user confusion.

The skilled reader will appreciate that the before-mentioned embodiments showing certain procedures and proposed sequences of steps are primarily given for demonstrating the disclosed method by way of example. Thus, it will be understood that those examples may be varied in various aspects like for example the ordering of steps, the degree of parallelization between steps, the implementation details of the single steps, the form in which data is stored, the way how the grouping of portlets is achieved, etc., and respective further embodiments can be obtained.

The disclosed system can take the form of an entirely software embodiment, an entirely hardware embodiment, or an embodiment containing both software and hardware elements. The figures include block diagram and flowchart illustrations of methods, apparatus(es) and computer program products according to an embodiment of the invention. It will be understood that each block in such figures, and combinations of these blocks, can be implemented by computer program instructions, hardware circuitry, and/or some combination of hardware and software. Computer program instructions that embody such blocks may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method in a Web portal environment for modifying a hierarchical navigation topology, wherein said hierarchical navigation topology includes interconnected nodes, wherein a Web portal page in said hierarchical navigation topology corresponds to a predetermined level in said hierarchical navigation topology, and wherein said Web portal page displays at least one portlet, the method comprising:

during navigation by a user of said hierarchical navigation topology including said Web portal, automatically sensing information about the navigational behavior of said user for each Web page visited during said user navigation;

calculating a number of page hits and a number of page target hits from said sensed information, wherein a page hit is defined as a first click to a page and a subsequent click being done within a first predetermined time range after said first click, and wherein a page target hit is defined as a first click to a page and a subsequent click being done after a second predetermined time range after said first click has passed;

using at least one predefined metric based on said sensed information for generating a utility ranking for each said Web page visited during said user navigation;

defining a user-specific topology based on a prioritization of said ranked Web pages, wherein higher ranked Web pages are arranged in relatively higher topology levels, wherein said prioritization of web pages is based on predetermined utility thresholds, and comprises promoting a node within said topology to a higher level if its utility threshold exceeds a given level-specific value and demoting a node within said topology to a lower level if its utility threshold is lower than said given level-specific value; and displaying said user-specific topology to said user after a subsequent log-in to said Web portal.

2. The method of claim 1, wherein an unused node is hidden within said user-specific topology.

3. The method of claim 2, wherein utility threshold calculation of a page includes a time-related weighting prioritizing more recently used pages.

4. The method of claim 1, further comprising:
  observing a context from at least one of the set consisting of current date, current time, and currently used device type;
  storing respective context information for a current user session; and
  using said context information as a filter for further page selection and page suppression in said user-specific topology.

5. A computer system including a computer readable memory, said computer readable memory having program code stored thereon for modifying a hierarchical navigation topology, wherein said hierarchical navigation topology includes interconnected nodes, wherein a Web portal page in said hierarchical navigation topology corresponds to a predetermined level in said hierarchical navigation topology, and wherein said Web portal page displays at least one portlet, said program code operable, when executed on said computer system, to cause said computer system to:
  during navigation by a user of said hierarchical navigation topology including said Web portal, automatically sense information about the navigational behavior of said user for each Web page visited during said user navigation;
  calculate a number of page hits and a number of page target hits from said sensed information, wherein a page hit is defined as a first click to a page and a subsequent click being done within a first predetermined time range after said first click, and wherein a page target hit is defined as a first click to a page and a subsequent click being done after a second predetermined time range after said first click has passed;
  use at least one predefined metric based on said sensed information for generating a utility ranking for each said Web page visited during said user navigation;
  define a user-specific topology based on a prioritization of said ranked Web pages, wherein higher ranked Web pages are arranged in relatively higher topology levels, wherein said prioritization of Web pages is based on predetermined utility thresholds, and wherein said program code is further operable, when executed on said computer system, to cause said computer system to promote a node within said topology to a higher level if its utility threshold exceeds a given level-specific value and demote a node within said topology to a lower level if its utility threshold is lower than said given level-specific value; and
  display said user-specific topology to said user after a subsequent log-in to said Web portal.

6. A computer program product including a computer readable memory, said computer readable memory having program code stored thereon for modifying a hierarchical navigation topology, wherein said hierarchical navigation topology includes interconnected nodes, wherein a Web portal page in said hierarchical navigation topology corresponds to a predetermined level in said hierarchical navigation topology, and wherein said Web portal page displays at least one portlet, said program code operable, when executed on said computer system, said program code comprising:
  program code for, during navigation by a user of said hierarchical navigation topology including said Web portal, automatically sensing information about the navigational behavior of said user for each Web page visited during said user navigation;
  program code for calculating a number of page hits and a number of page target hits from said sensed information, wherein a page hit is defined as a first click to a page and a subsequent click being done within a first predetermined time range after said first click, and wherein a page target hit is defined as a first click to a page and a subsequent click being done after a second predetermined time range after said first click has passed;
  program code for using at least one predefined metric based on said sensed information for generating a utility ranking for each said Web page visited during said user navigation;
  program code for defining a user-specific topology based on a prioritization of said ranked Web pages, wherein higher ranked Web pages are arranged in relatively higher topology levels, wherein said prioritization of Web pages is based on predetermined utility thresholds, and wherein said program code for defining said user-specific topology promotes a node within said topology to a higher level if its utility threshold exceeds a given level-specific value and demotes a node within said topology to a lower level if its utility threshold is lower than said given level-specific value; and
  program code for displaying said user-specific topology to said user after a subsequent log-in to said Web portal.

7. The method of claim 1, wherein said second predetermined time range comprises a predetermined median time range for a user resting on a single Web page.

8. The computer system of claim 5, wherein an unused node is hidden within said user-specific topology.

9. The computer system of claim 8, wherein utility threshold calculation of a page includes a time-related weighting prioritizing more recently used pages.

10. The computer system of claim 5, said program code further operable, when executed on said computer system, to cause said computer system to:
  observe a context from at least one of the set consisting of current date, current time, and currently used device type;
  store respective context information for a current user session; and
  use said context information as a filter for further page selection and page suppression in said user-specific topology.

* * * * *